INVENTOR.
HENRI G. BUSIGNIES
BY
ATTORNEY

Nov. 29, 1949 H. G. BUSIGNIES 2,489,263
DIRECTION FINDER
Filed Aug. 6, 1945 3 Sheets-Sheet 3

INVENTOR.
HENRI G. BUSIGNIES
BY
ATTORNEY

Patented Nov. 29, 1949

2,489,263

UNITED STATES PATENT OFFICE 2,489,263

DIRECTION FINDER

Henri G. Busignies, Forest Hills, N. Y., assignor to Federal Telephone and Radio Corporation, New York, N. Y., a corporation of Delaware Application August 6, 1945, Serial No. 609,216

10 Claims. (Cl. 343—118)

This invention relates to direction finder systems and more particularly to systems of the type employing a rotatable directively sensitive pick-up.

A principal object of the invention is to provide a direction finder system having an increased degree of flexibility as regards the duration of the picked-up direction finder signals and their translation into a resultant visual indication.

Another principal object is to provide a direction finder system of the directionally sensitive rotatable pick-up type, in conjunction with a visual indicator of the integrating type and an intervening storage device which makes a non-visual stored record of the successive elements of the polar diagram of the pick-up.

A feature of the invention relates to a direction finder system employing a rotatable direction finder antenna and a visual indicator of the integrating type, together with a special form of storage device having a commutating arrangement synchronized with the antenna radiation, the indicator also having a beam-deflecting control which is synchronized with said antenna.

A further feature relates to the production of a relatively persistent visual indication notwithstanding that the original direction finder signals are of momentary duration.

A still further feature relates to the novel organization and arrangement of parts constituting an improved direction finder system employing an integrating indicator.

Other features and advantages will become apparent after a consideration of the following detailed descriptions and the appended claims.

Figure 1:
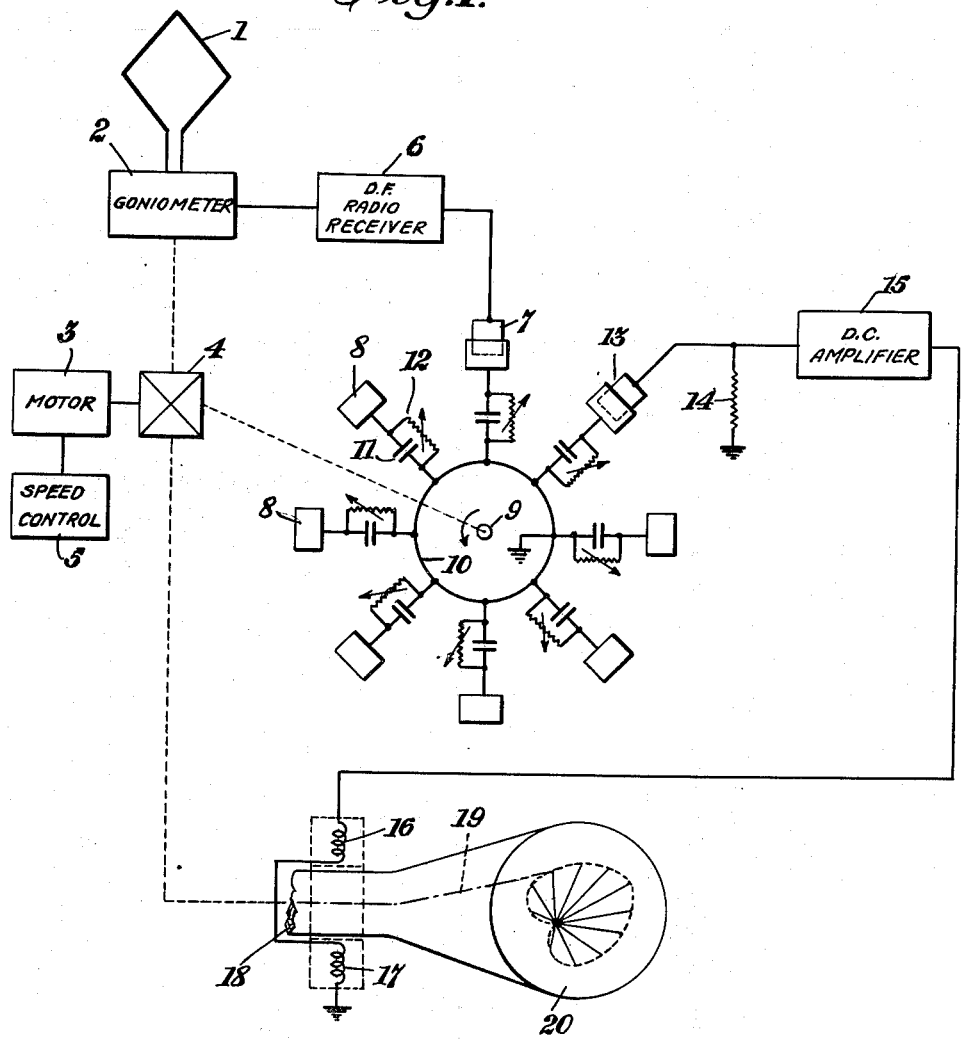
Fig. 1 represents a preferred embodiment of the invention.

In systems employing rotatable direction-finder loop antennae, it very frequently happens that the signals from the distant source to be located, are radiated for only a short or momentary interval. It is necessary with certain systems to subject the loop to a considerable number of rotations in order to produce a sufficiently persistent signal for observation. This is particularly true in the case of indicators of the integrating type such for example as cathode-ray tube oscilloscopes and the like. It is highly desirable therefore, to be able to produce a sufficiently satisfactory visible indication even though the original wave diagram is in existence for only momentary intervals. With an arrangement according to the invention, it is possible to provide the operator of the direction-finder equipment an appreciable time margin in order to read the bearing of the distant source subsequent to the picking up of the direction finder signals. Furthermore, it is highly desirable to produce an indication which is a substantially true representation of the actual polar diagram of the field intensity around the loop as the latter is rotating.

There are shown in the drawing, two embodiments of the invention, for achieving the above desired advantages.

Referring to Fig. 1, there is shown a rotatable direction-finder loop antenna 1, which is connected to any well-known goniometer control and commutating mechanism 2, for producing signals which correspond to the signals picked up by the loop. Loop 1 is continuously rotated by means of a suitable driving motor 3, through transmission gearing 4, and preferably motor 3 is closely controlled as to speed by any well-known speed control device or circuit 5. The signals from the goniometer 2 are amplified and detected in any well-known form of direction-finder radio receiver 6, and the signals from the receiver 6 are applied to a distributor member or brush 7. Brush 7 is in the form of a conductive plate having appreciable area so as to act as an electrostatic coupling to a series of spaced condenser plates 8, which are suitably mounted at equal radial distances on and around a rotatable shaft 9. Each of the condenser plates 8 is connected to ground 10 through an individual RC combination comprising condenser 11 and parallel adjustable resistance 12. Each of the RC combinations acts therefore as a storage element for the direction-finder signals which are applied by means of condenser plate 7. The condensers 11 and the associated resistors 12 can be provided so as to have a very quick charging path through the output circuit of the receiver and a slower discharging path through the input circuit of amplifier 15. The plates 8 are adapted to be rotated as a unit past the stationary coupling element 7 and in slightly spaced relation thereto so that the coupling is by space induction. For the purpose of feeding the stored signals to the indicator part of the system, another coupling element 13 similar to member 7 is provided. Element 13 may be mounted at any desired relation around the periphery of the rotating members 8 and with respect to the member 7 so as to provide any predetermined time delay between the intervals of charge and discharge.

It will be understood of course, that the invention is not limited to a rotating commutator with stationary coupling devices 7 and 13. If desired, the plates 8 may be stationary and the members 7 and 13 can be mounted in proper spaced relation and rotated as a unit. In any event, the relative rotation of the plates 8 and the members 7 and 13, is synchronized with the rotation of loop 1, for example by being driven from the motor 3 as indicated by the dotted line. The coupling member 13 is connected to a relatively high resistance 14 such as a grid leak resistor. The stored voltages on condensers 11 are then applied to a D. C. amplifier 15 of any well-known construction, whose amplified D. C. output is connected through a pair of field coils 16, 17, which likewise are adapted to be rotated as a unit in synchronism with the loop 1 as indicated by the dotted line connection to motor 3. The coils 16 and 17 may be of any construction and arrangement well-known in the cathode-ray tube art and are mounted for example around the neck portion 18 of a cathode-ray tube oscilloscope, so as to subject the electron beam 19 to a rotary scanning trace over the fluorescent screen 20 of the oscilloscope. The deflection of the beam 19 will therefore be proportionate to the charge on each of the condensers 11 and the angular length of each section of this trace will be determined by the duration of contact between the member 13 and each of the plates 8 in succession. In other words, if the polar diagram around the loop 1 is in the shape, for example, of a cardioid, then as the field coils 16, 17, are rotated in synchronism with the loop 1, and since they are energized by D. C. signals proportionate to the polar diagram, the trace envelope as it appears upon the screen 20 will be a similar cardioid by means of which the operator can directly determine the bearing of the distant source.

While Fig. 1 shows a commutator or distributor comprising 8 segments, it will be understood that a greater or less number may be employed depending upon the fineness of resolution desired in the trace on the screen 20. If the field pattern of the loop 1 is a true cardioid, 8 segments and 8 storage elements 11—12 are sufficient to give a satisfactory cardioid trace on the screen 20. Consequently, by adjusting the charging time constant of each of the condensers 11, these condensers may be given a very rapid charge corresponding to a momentary existence of the field acting on antenna 1, and a relatively slow discharge can be provided thus providing the operator with a sufficient time interval to determine from the reproduced field pattern on the screen 20, the bearing of the momentary radiating source.

Figure 2:
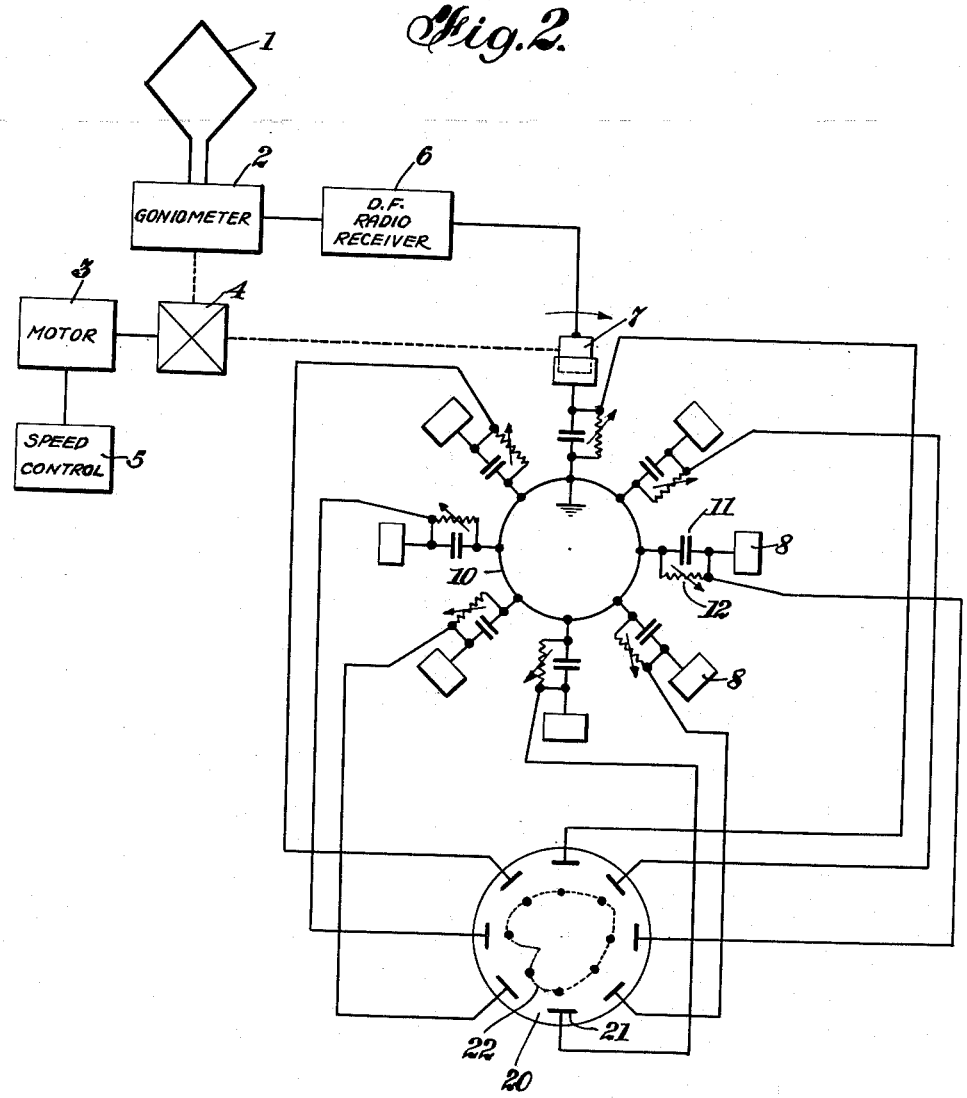
Fig. 2 represents an alternative embodiment.

Fig. 2 shows a modification of Fig. 1, wherein parts corresponding to those of Fig. 1 bear the same designation numerals. In this embodiment, the cathode-ray tube is provided with a series of deflector plates 21, equal in number to the number of plates 8 of the distributor. Each of the distributor plates 8 is directly connected to a corresponding one of the deflector plates 21. This avoids the necessity of employing a separate rotating deflecting field such as that provided by the coils 16 and 17 of Fig. 1, and results in the production of a trace 22 on the cathode-ray tube screen 20 which is a substantial duplicate of the polar diagram of the antenna 1 with respect to the radiation from the distant source to be located.

If the polar diagram, instead of being a cardioid, is a figure-of-eight, it is necessary that the relative location between the brushes 7, 13, Fig. 1, and the distributor segments 8, be twice the rotational speed of the antenna 1. In the case of a figure-of-eight diagram, it is not necessary that the discharging of the condensers 11 be at twice the rate of radiation of the antenna 1 since it is necessary only to make sure that the charging of the condensers 11 is at twice the rotational speed of the antenna. In fact, it is not necessary that the member 13 maintain any fixed space relation with member 7. The rotation of the cathode-ray tube beam 19 should however be synchronous with the rotation of the discharging member 13. With this arrangement, it is preferable to make the plates 8 stationary and to rotate the members 7 and 13, member 7 being driven in locked synchronism with the antenna 1, whereas the member 13 may be driven at any desired speed. In that event, the field coils 16 and 17 instead of being driven in synchronism with member 7 will be driven in synchronism with member 13.

Figure 3:
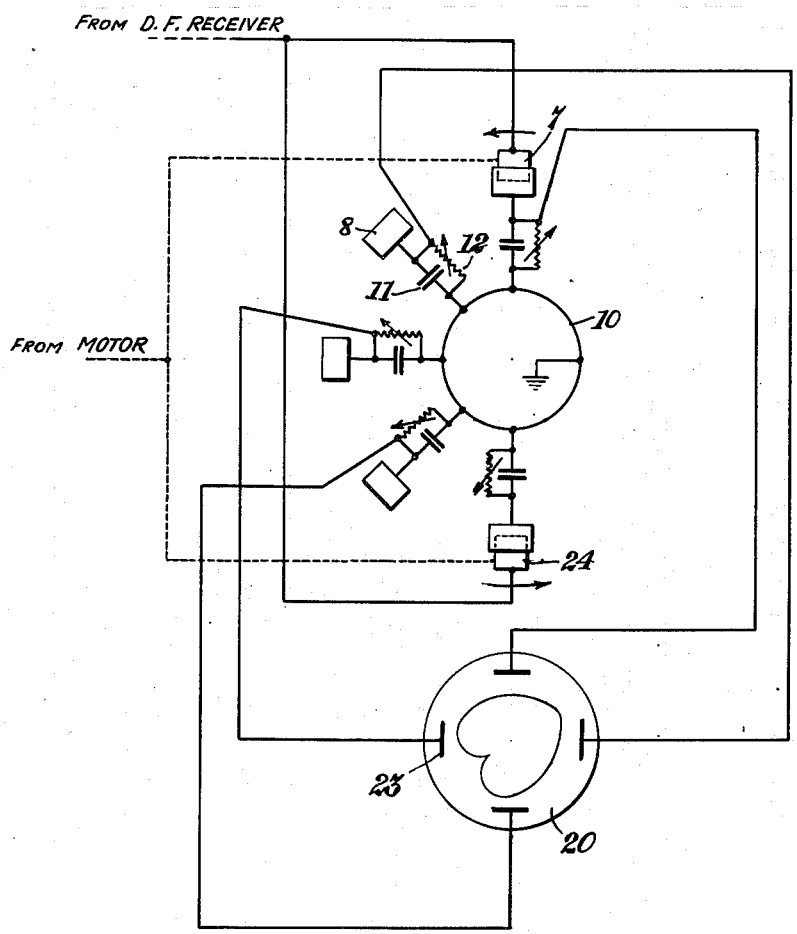
Fig. 3 is a modification of Fig. 1.

In the case of a true cardioid field diagram pattern, it is possible to produce a satisfactory cardioid trace merely by using a set of four RC storing networks as shown in Fig. 3, and these storing networks are connected respectively to four individual commutator segments 8. This permits the use of a conventional four-plate deflector cathode-ray tube where the plates are located symmetrically around the axis of rotation of the cathode-ray beam. However, these beam deflector plates 23 are connected directly to respective condensers 11. Consequently, it is not necessary to employ a separate brush or coupling element corresponding to element 13 (Fig. 1).

Instead of arranging the segments 8 in a complete circle, they may be arranged in a half circle and another brush or coupling member 24 can be connected in parallel with member 7. It will be understood of course, that the invention is not limited to the use of a capacity coupling to the commutator segments 8 in any of the foregoing embodiments. If desired, the members 8 may take the form of pick-up coils and the members 7 and 13 may take the form of coupling coils. Furthermore, if desired, the members 7 and 13 may be in the form of brushes which contact with the successive commutator segments.

It will be understood that the signals applied to member 7 in each of the embodiments are direct current signals. Therefore, if necessary, a separate rectifier may be connected between the receiver 6 and the member 7.

Various changes and modifications may be made in the disclosed embodiments without departing from the spirit and scope of the invention.

What is claimed is:

1. In a direction-finder system, a rotatable searching pick-up antenna, radio receiver means to detect direction-finder signals picked-up by said antenna, a plurality of electrostatic signal storing elements, a signal indicator of the integrating type, commutator means for charging said storing elements in cyclical succession in synchronism with the rotation of said antenna, and means to couple said storing elements in succession to said indicator to produce an integrated trace of the polar diagram around said antenna.

2. In a direction-finder system, a rotatable searching pick-up antenna, radio receiver means to detect direction-finder signals picked-up by said antenna and including means to rectify said signals, a plurality of condensers, a commutator for charging said condensers in succession in synchronism with the scanning of successive segments of the polar diagram around said antenna as it is rotated, a cathode-ray tube indicator, means to rotate the beam of the cathode-ray tube in synchronism with said antenna, and means to deflect said beam successively under control of said condensers to reproduce a trace corresponding to said polar diagram.

3. A direction-finder system according to claim 2 in which each of said condensers is shunted by an individual adjustable discharging circuit.

4. A direction-finder system according to claim 2 in which each of said condensers is shunted by a resistor each of said condenser-resistor combinations having a fast charging path and a slow discharging path.

5. A direction-finder system according to claim 2 in which the means to rotate the cathode-ray beam comprises a pair of field coils which are mechanically rotated in synchronism with the rotation of said antenna.

6. A direction-finder system according to claim 2 in which the means to rotate the cathode-ray beam, comprises a pair of field coils which are mechanically rotated in synchronism with the rotation of said antenna and said rectified signals are applied to said windings to control the beam deflection.

7. A direction-finder system comprising a rotatable direction-finder antenna having a directional polar diagram with relation to a distant radiation source, a direction-finder radio receiver for producing D. C. signals corresponding successively to successive sections of said diagram as scanned by said antenna during its rotation, a plurality of storing condensers, means to charge said condensers successively in synchronism with the scanning of said successive segments of the polar diagram, a cathode-ray tube having a series of beam deflector elements equal in number the number of said condensers, and means to energize said deflector members successively by said condensers.

8. A system according to claim 7 in which said beam deflector elements are in the form of electrostatic plates which are directly connected to corresponding ones of said condensers.

9. A direction-finder system comprising a rotatable direction-finding antenna having a cardioid polar diagram with relation to a distant radiation source, a direction-finding radio receiver for producing D. C. signals corresponding successively to successive sections of said diagram as scanned by said antenna, a cathode-ray tube having a series of four electrostatic beam deflector plates for tracing said diagram, and means to charge said plates successively in accordance with the scanned segments of said diagram, the last-mentioned means including a set of four storing condensers connected respectively to corresponding ones of said deflector plates, and a commutator for charging said condensers under control of said D. C. signals and successively in synchronism with the rotation of said antenna.

10. A direction-finder system according to claim 9 in which the means for charging said condensers comprises a commutator having a series of contact segments one for each of said condensers and a pair of charging brushes mounted around said commutator, said brushes being connected in parallel to said receiver.

HENRI G. BUSIGNIES.

REFERENCES CITED

The following references are of record in the file of this patent:

UNITED STATES PATENTS

| Number | Name | Date |
|---|---|---|
| 2,188,649 | Carter | Jan. 30, 1940 |
| 2,223,513 | Fransson | Dec. 3, 1940 |
| 2,403,967 | Busignies | July 16, 1946 |